July 17, 1962 R. HEINTZ ET AL 3,044,893
METHOD AND APPARATUS FOR FORMING COATINGS OF VITREOUS
MATERIAL ON A HEATED METAL BILLET
Filed March 21, 1960 2 Sheets-Sheet 1

INVENTORS.
Rene Heintz
Jean-Marc Jour
BY
THEIR ATTORNEYS

Patented July 17, 1962

3,044,893
METHOD AND APPARATUS FOR FORMING COATINGS OF VITREOUS MATERIAL ON A HEATED METAL BILLET

René Heintz, Berlaimont, Nord, and Jean-Marc Jour, Aulnoye, Nord, France, assignors to Compagnie du Filage des Metaux et des Joints Curty, Paris, France, a corporation of France
Filed Mar. 21, 1960, Ser. No. 16,580
Claims priority, application France Mar. 26, 1959
2 Claims. (Cl. 117—18)

This invention relates to method and apparatus for forming coatings of vitreous material on a heated metal billet which is to be extruded. Sejournet et al. Patent No. 2,538,917 describes a method of hot extrusion of metal and alloy billets which are difficult to extrude, particularly steel billets. According to that patent, a vitreous lubricant, for example, glass, is employed in carrying out the extrusion operation. In the case where a tube is to be extruded, a hollow metal billet and a mandrel operated by a punch are employed. A glass tube is fitted over the mandrel, the mandrel and glass tube are inserted into the bore of the hollow billet, and the assembly of billet, mandrel and glass tube is introduced into the container of an extrusion press. The punch is then operated to extrude the billet through a die between the wall of the die and the mandrel, the glass tube surrounding the mandrel operating to lubricate the mandrel during the extrusion operation.

According to the present invention, powdered glass or other vitreous material in powder form is employed to form a vitreous coating on the wall of a bore of the metal billet or on the external surface of the metal billet or on both of these surfaces simultaneously. In the method of coating the wall of a bore of a billet with a layer of vitreous material, powdered vitreous material is placed in the bore of the metal billet which is heated to a temperature sufficient to melt the vitreous material and the billet is rotated on its axis or is rolled back and forth along a supporting surface to distribute the vitreous material uniformly on the surface of the bore, the vitreous material melting due to its contact with the heated metal billet.

The present invention also provides a method of simultaneously coating the wall of a bore of a metal billet and the external surface of the billet with layers of vitreous material. In carrying out such method, powdered vitreous material is placed in the bore of the metal billet which is heated to a temperature sufficient to melt the vitreous material, the billet is rotated on its axis and powdered vitreous material is distributed onto the external surface of the billet while it is rotating on its axis or a layer of powdered vitreous material is placed on a supporting surface and the billet is rolled back and forth over the layer of vitreous material on the supporting surface.

In the accompanying drawings which illustrate three preferred embodiments of our invention, FIGURE 1 is a side elevation of one embodiment of apparatus suitable for carrying out the method;

Figure 1:
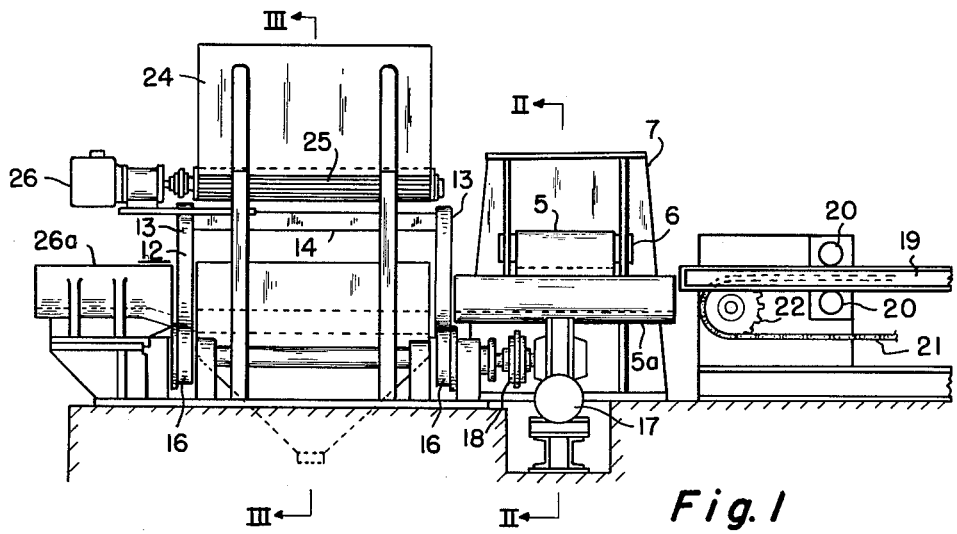
Figures 2, 3:
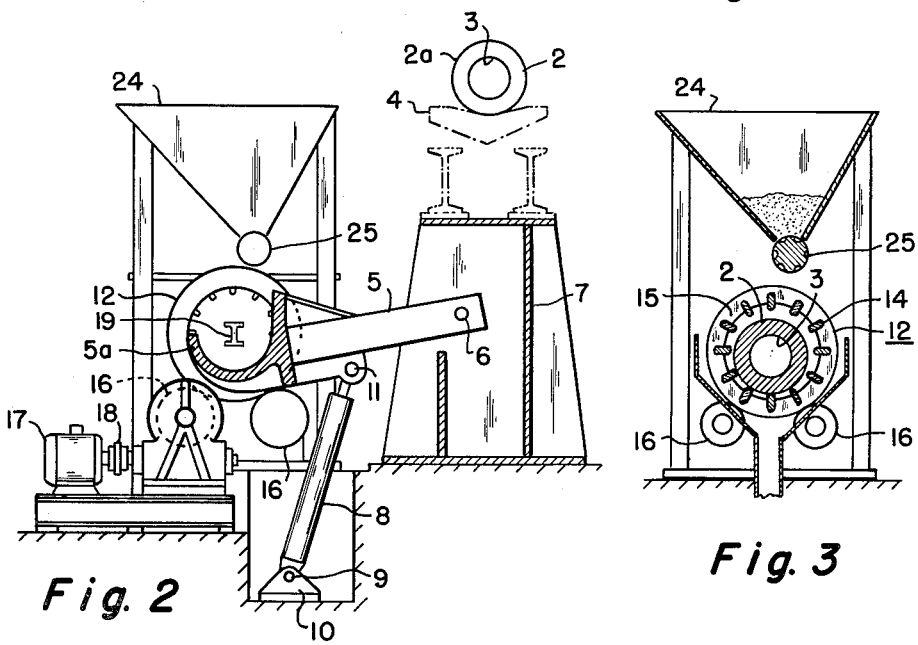
FIGURE 2 is a vertical section taken along the line II—II of FIGURE 1.
FIGURE 3 is a vertical section taken along the line III—III of FIGURE 1.

Referring more particularly to the embodiment shown in FIGURES 1–3, a hollow metal billet 2, such as a steel billet, having a bore 3 is shown on a conveyor 4. A transfer arm 5 is pivotally mounted at 6 on a supporting structure 7 and is provided at its outer end with a cradle portion 5a for holding a billet. The arm 5 is movable from the position shown in FIGURE 2 to a position such that the cradle portion 5a lies adjacent the conveyor 4. The arm 5 is moved by a cylinder and piston 8 pivotally mounted at its lower end at 9 on a support 10 and pivotally connected at its upper end as indicated by reference numeral 11 to the transfer arm 5.

The transfer arm 5 is raised to receive a billet 2 from the conveyor 4 and the arm is then lowered to the position shown in FIGURE 2 so that the billet is in alignment with a latticed drum indicated generally by reference numeral 12. This drum comprises two annular heads or ends 13 connected by spaced bars 14 which provide spaces 15 between the bars. The latticed drum 12 is supported at each end by two rollers 16, at least one of the rollers being driven by a motor 17 through a coupling 18. Rotation of the rollers 16 causes rotation of the latticed drum 12 resting thereon.

With the parts shown in the positions indicated in FIGURE 1, i.e., with the cradle portion 5a of the arm 5 in alignment with the drum 12, and a billet supported in the cradle portion, a ram 19 guided by rollers 20 and actuated by a chain 21 passing around a sheave 22 is moved to the left, as viewed in FIGURE 1, so as to introduce the billet 2 into the drum 12. At some stage prior to introducing the billet into the drum, a quantity of powdered vitreous material is placed in the bore 3 of the billet.

A hopper 24 containing powdered vitreous material is located above the drum 12 and is provided at its exit opening with a distributor 25 which is rotated by a motor 26 to deliver the powdered vitreous material from the hopper onto the billet 2 through the spaces 15 in the drum while the drum and the billet located therein are rotating. In this manner, both the bore 3 of the billet and the external surface 2a of the billet are uniformly coated with a layer of the vitreous material, it being understood that the billet is heated to a temperature sufficient to melt the vitreous material prior to its introduction into the drum 12.

The ram 19 is then operated to push the billet onto a table 26a from which it is taken to the extrusion press.

Figure 4:
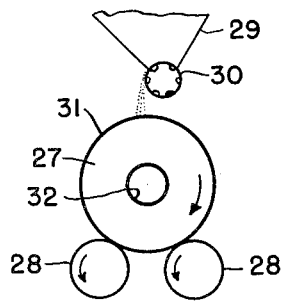
FIGURE 4 is a diagrammatic end elevation of another embodiment of the invention.

The embodiment shown in FIGURE 4 is generally similar to that shown in FIGURES 1–3 except that the billet 27 is supported directly on rollers 28 which are driven by means (not shown) instead of the billet being placed in a latticed drum and the drum rotated. As shown in FIGURE 4, powdered vitreous material contained in hopper 29 is delivered from the hopper by a distributor 30 rotated by means (not shown), thereby causing the powdered material to rain or drop down onto the outer surface 31 of the billet 27. The billet 27 is provided with a bore 32 and a quantity of powdered vitreous material is introduced into the bore 32 prior to distributing vitreous material onto the outer surface 31 of the billet. In the event, however, that it is desired only to coat the bore 32 with a layer of vitreous material, the powdered vitreous material is placed in the bore but no vitreous material is distributed onto the outer surface 31 of the billet by the distributor 30. Likewise, if it is desired only to coat the outer surface 31 of the billet, no vitreous material is placed in the bore 32.

The arrangement shown in FIGURES 1–3, which includes the latticed drum 12, has the advantage of being suitable for use with billets of square or polygonal cross section as well as with billets of round cross section.

Figure 5:
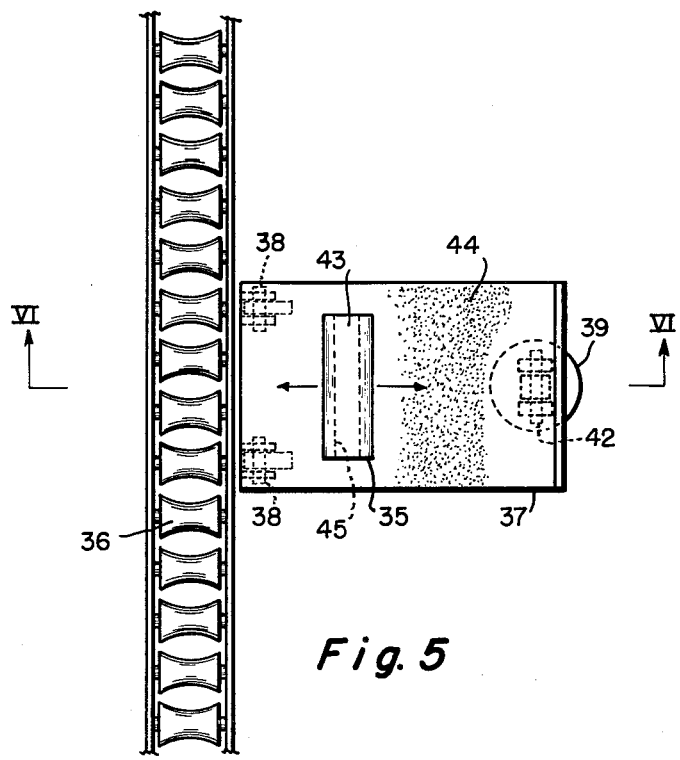
FIGURE 5 is a plan view of a further embodiment.
Figure 6:
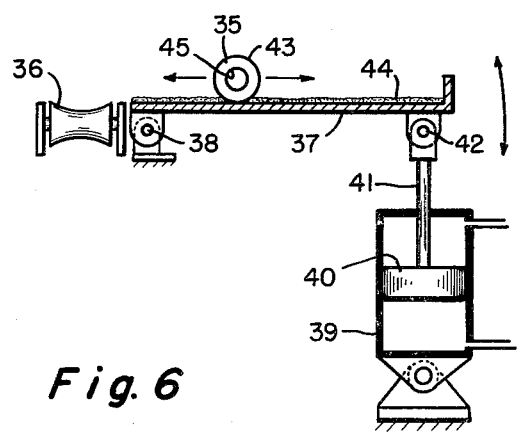
FIGURE 6 is a vertical section taken along the line VI—VI of FIGURE 5.

Referring now to the embodiment shown in FIGURES 5 and 6, a billet indicated generally by reference numeral 35 is brought by a roller table 36 or by a traveling chain to a position adjacent a rocking plate 37. This rocking plate is pivoted adjacent one end as indicated by reference numeral 38 and can be rocked about the pivot 38 by means of a cylinder 39, piston 40 and piston rod 41 which is pivotally connected at 42 to the rocking plate 37.

When it is desired to coat only the external surface 43 of the billet 35 with a layer of vitreous material, a layer 44 of powdered vitreous material is placed on the plate 37, the billet is pushed by means (not shown) from the roller table 36 onto the rocking plate 37 and the plate is rocked so as to cause the billet 35 to roll back and forth on the layer 44 of vitreous material. When it is desired to simultaneously coat the bore 45 of the billet and the external surface 43 of the billet, powdered vitreous material is placed in the bore of the billet, a layer of powdered vitreous material is placed on the rocking plate 37 and the billet is rolled back and fourth along the layer of vitreous material on the rocking plate 37. The back-and-forth movement of the billet causes the vitreous material placed in the bore of the billet to be evenly distributed around the bore of the billet. It also provides an even coating of vitreous material on the external surface 43 of the billet.

The invention is not limited to the preferred embodiments but may be otherwise embodied or practiced within the scope of the following claims.

We claim:

1. The method of simultaneously coating the wall of a bore of a metal billet and the external surface of the billet with layers of vitreous material, which comprises placing powdered vitreous material in the bore of a metal billet heated to a temperature sufficient to melt the vitreous material, introducing the billet into a latticed drum, rotating the drum to rotate the billet and distributing powdered vitreous material through the latticed drum onto the external surface of the billet while it is rotating.

2. Apparatus for simultaneously coating the wall of a bore of a metal billet and the external surface of the billet with layers of vitreous material, which comprises a set of rollers, means for driving said rollers, a latticed drum supported on and rotated by said rollers, means for introducing a heated metal billet into said drum, a hopper for powdered vitreous material located above said drum and a distributor for distributing powdered vitreous material from said hopper onto the external surface of the billet through said latticed drum.

References Cited in the file of this patent

UNITED STATES PATENTS

| | | |
|---|---|---|
| 862,285 | Schmidt | Aug. 6, 1907 |
| 1,361,869 | Kebler | Dec. 14, 1920 |
| 2,034,592 | Newman | Mar. 17, 1936 |
| 2,737,461 | Heisler et al. | Mar. 6, 1956 |
| 2,908,587 | Evans et al. | Oct. 13, 1959 |

FOREIGN PATENTS

| | | |
|---|---|---|
| 74,990 | Denmark | Nov. 17, 1952 |